US009335555B1

United States Patent
Teng et al.

(10) Patent No.: US 9,335,555 B1
(45) Date of Patent: May 10, 2016

(54) DEVICE FOR CONVERTING UNPOLARIZED INCIDENT LIGHT INTO POLARIZED EMITTING LIGHT

(71) Applicant: National Taiwan Normal University, Taipei (TW)

(72) Inventors: Tun-Chien Teng, Taipei (TW); Li-Wei Tseng, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 14/517,803

(22) Filed: Oct. 18, 2014

(51) Int. Cl.
*G02B 5/30* (2006.01)
*G02B 27/28* (2006.01)

(52) U.S. Cl.
CPC ............ *G02B 27/283* (2013.01); *G02B 5/3083* (2013.01); *G02B 27/286* (2013.01)

(58) Field of Classification Search
CPC .. G02B 27/283; G02B 5/3083; G02B 27/286; G02B 27/10; G02B 27/14; G02B 27/145; G02B 27/285
USPC ...................... 359/489.08, 489.09, 489.1, 529
See application file for complete search history.

(56) References Cited

U.S. PATENT DOCUMENTS

| | | | | |
|---|---|---|---|---|
| 5,428,469 A * | 6/1995 | Willett | ................. | H04N 5/7441 348/E5.141 |
| 5,684,630 A * | 11/1997 | Arai | ...................... | G02B 27/286 359/485.06 |
| 5,982,540 A * | 11/1999 | Koike | ................... | G02B 6/0056 349/62 |
| 7,121,671 B2 * | 10/2006 | Lee | ........................ | G02B 5/122 359/485.04 |
| 2004/0090763 A1 * | 5/2004 | Li | ........................ | H04N 5/7416 362/19 |
| 2005/0174641 A1 * | 8/2005 | Greenberg | ........... | G02B 27/283 359/487.03 |
| 2006/0039006 A1 * | 2/2006 | Van Der Pasch | ....... | G02B 5/122 356/493 |
| 2008/0088815 A1 * | 4/2008 | Nomura | ............... | G02B 27/283 355/71 |
| 2008/0231953 A1 * | 9/2008 | Young | .................. | G02B 27/286 359/489.08 |
| 2011/0310586 A1 * | 12/2011 | Jen | ........................ | G02B 27/283 362/19 |
| 2012/0140184 A1 * | 6/2012 | Bruzzone | ............. | G02B 27/283 353/20 |
| 2013/0169894 A1 * | 7/2013 | Ouderkirk | .......... | G02B 27/1033 349/9 |
| 2013/0176540 A1 * | 7/2013 | Wei | ...................... | G03B 21/204 353/20 |

OTHER PUBLICATIONS

"Slim planar apparatus for converting LED light into collimated polarized light uniformly emitted fr om its top surface" extracted from Optics Express, vol. 22, Issue S6, pp. A1477-A1490 (2014).

* cited by examiner

*Primary Examiner* — Frank Font
(74) *Attorney, Agent, or Firm* — Chun-Ming Shih

(57) ABSTRACT

A converting device converts an unpolarized incident light into a polarized emitting light. The converting device includes a polarizing or polarization beam splitter, a converting module, and a retroreflector. The polarizing or polarization beam splitter splits the unpolarized incident light into a first polarization wave and a second polarization wave, the polarizing or polarization beam splitter reflecting the first polarization wave and allowing the second polarization wave passing through thereon. The converting module receives the second polarization wave and converting the polarization direction of the second polarization wave to match or approximate a polarization direction of the first polarization wave, and guiding the converted second polarization wave to an output direction. The retroreflector is coupled to the polarizing or polarization beam splitter and reflects the first polarization wave to the output direction. Finally, the reflected first polarization wave and the converted second are combined into the polarized emitting light.

8 Claims, 8 Drawing Sheets

DEVICE FOR CONVERTING UNPOLARIZED INCIDENT LIGHT INTO POLARIZED EMITTING LIGHT

BACKGROUND OF THE INVENTION

1. Field of the Invention

The present invention is about a converting device. More particularly, the present invention is about a converting device for converting unpolarized incident light into polarized emitting light.

2. Description of the Prior Art

Nowadays LCD monitor architectures include backlight modules, lower polarizing plate, LCD module, color filter, and upper polarizing plate. And the function of the lower polarizing plate is to convert the unpolarized light to linear polarization light and provide the linear polarization light to the LCD module.

To provide linear polarization light source, conventional technique uses the polarization plate to convert the unpolarized light to the polarization light. The polarization plate is coated with a polarization layer to allow the desired polarization wave portion passing through, and absorb the undesired polarization light.

By the conventional technique, the energy of the undesired polarization light losses on the coating layer thence reducing energy usage efficiency of input light.

Thus, providing a device which is able to configure the energy of converting light effectively is a technical issue needed to be solved in the technical field.

SUMMARY OF THE INVENTION

To solve the previous technical problems, one objective of the present application is providing a converting device for converting unpolarized incident light into polarized emitting light.

To achieve the aforementioned objective, the present application provides a converting device, which comprises a polarizing or polarization beam splitter, a converting module, and a retroreflector. The polarizing or polarization beam splitter splits unpolarized incident light into a first polarization wave and a second polarization wave. Then the polarizing or polarization beam splitter reflects the first polarization wave and allows the second polarization passing through thereon. The converting module receives the second polarization wave, converts a polarization direction of the second polarization wave to match or approximate a polarization direction of the first polarization wave, and guides the converted second polarization wave to an output direction. The retroreflector is coupled to the polarizing or polarization beam splitter and reflects the first polarization wave to the output direction. Finally, the reflected first polarization wave and the converted second polarization wave are jointly combined to form the polarized emitting light.

To achieve the aforementioned objective, the present application provides an array device. The array device comprises a plurality of aforementioned converting devices.

To achieve the aforementioned objective, the present application provides an array device. The array device comprises a polarizing or polarization beam splitter, a plurality of converting module, and a retroreflector. The polarizing or polarization beam splitter splits the unpolarized incident light into a first polarization wave and a second polarization wave. Then the polarizing or polarization beam splitter reflects the first polarization wave, and allows the second polarization wave passing through thereon. The converting modules receive the second polarization wave, convert a polarization direction of the second polarization wave to match or approximate a polarization direction of the first polarization wave, and guide the converted second polarization wave to an output direction. The retroreflector is coupled to the polarizing or polarization beam splitter and reflects the first polarization wave to the output direction. Finally, the reflected first polarization wave and the converted second are jointly combined to form the polarized emitting light.

The converting device of present application reflects the desired polarization wave (first polarization wave), converts the undesired polarization wave (second polarization wave) into the desired polarization wave, and jointly combines the reflected first polarization wave and converted second polarization wave to form an emitting polarized light. Comparing with the conventional polarization apparatus, the converting device of the present application has better efficiency of energy usage.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
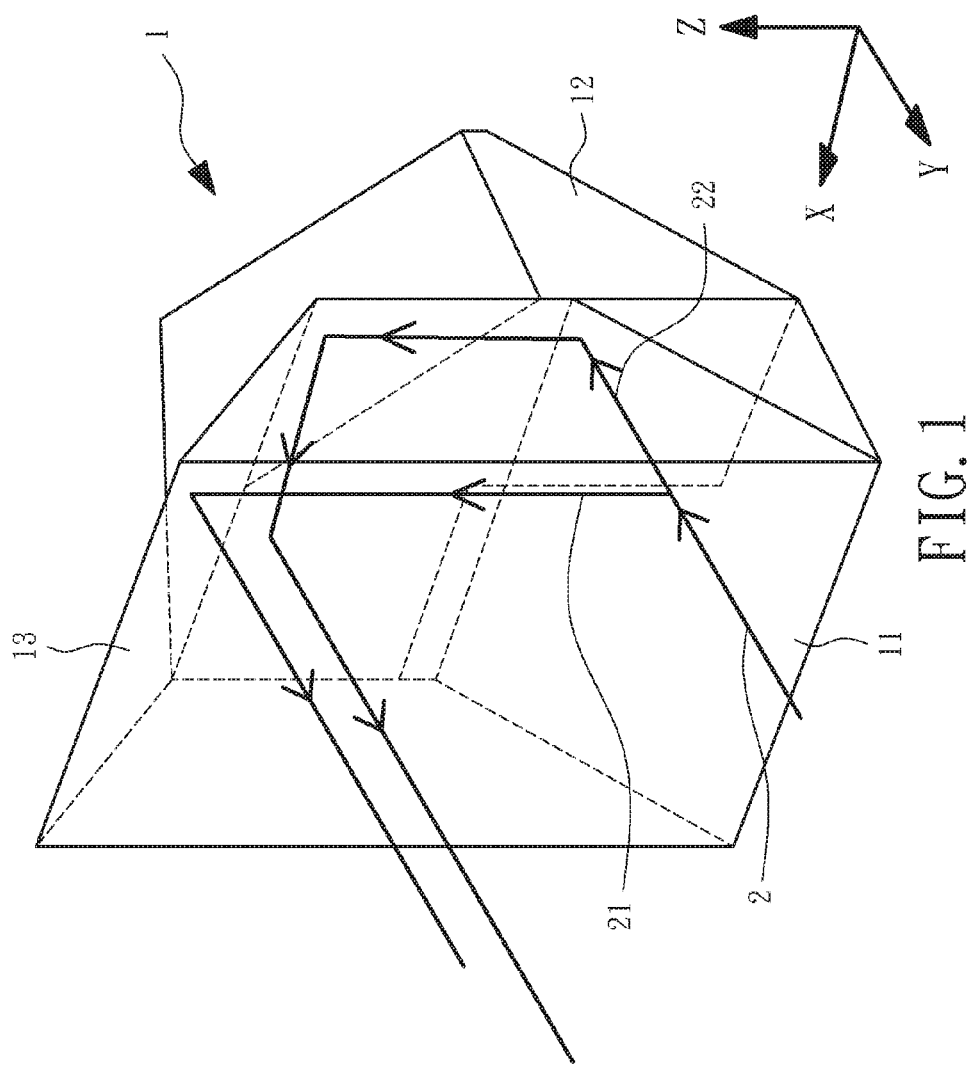
FIG. 1 shows a structure diagram of converting device of the present application.

FIG. 1 shows a device for converting unpolarized incident light 2 into polarized emitting light. The converting device 1 comprises a polarizing or polarization beam splitter 11, a converting module 12 and a retroreflector 13. The polarizing or polarization beam splitter 11 is configured to split the unpolarized incident light 2 into a first polarization wave 21 and a second polarization wave 22. The polarizing or polarization beam splitter 11 reflects the first polarization wave 21 and allows the second polarization wave 22 passing through thereon. The converting module 12 receives the second polarization wave 22 and converts a polarization direction thereof to match or approximate the polarization direction of first polarization wave 21, and guiding the converted second polarization wave 22 to an output direction. The retroreflector 13 is coupled to the polarizing or polarization beam splitter 11 and reflects the first polarization wave 21 to the output direction. Finally, the reflected first polarization wave 21 and the converted second polarization wave 22 are jointly combined to form the polarized emitting light.

The polarization wave directions of the first polarization wave 21 and the second polarization wave 22 are orthogonal to each other. For example, when the first polarization wave 21 is TE wave, then the second polarization wave 22 is TM wave. In contrast, if the first polarization wave 21 is TM wave, then the second polarization wave 22 is TE (Transverse Electric) wave.

The polarizing or polarization beam splitter 11 is a prism coated with a splitting layer (ex: 3M™ DBEF (Dual Brightness Enhancement Film) material) to split the unpolarized light into TE wave and TM (Transverse Magnetic) wave. The retroreflector 13 is another prism coated with a reflecting layer (ex: sliver coating) to retroreflector 13 the desired polarization wave.

Figure 2:
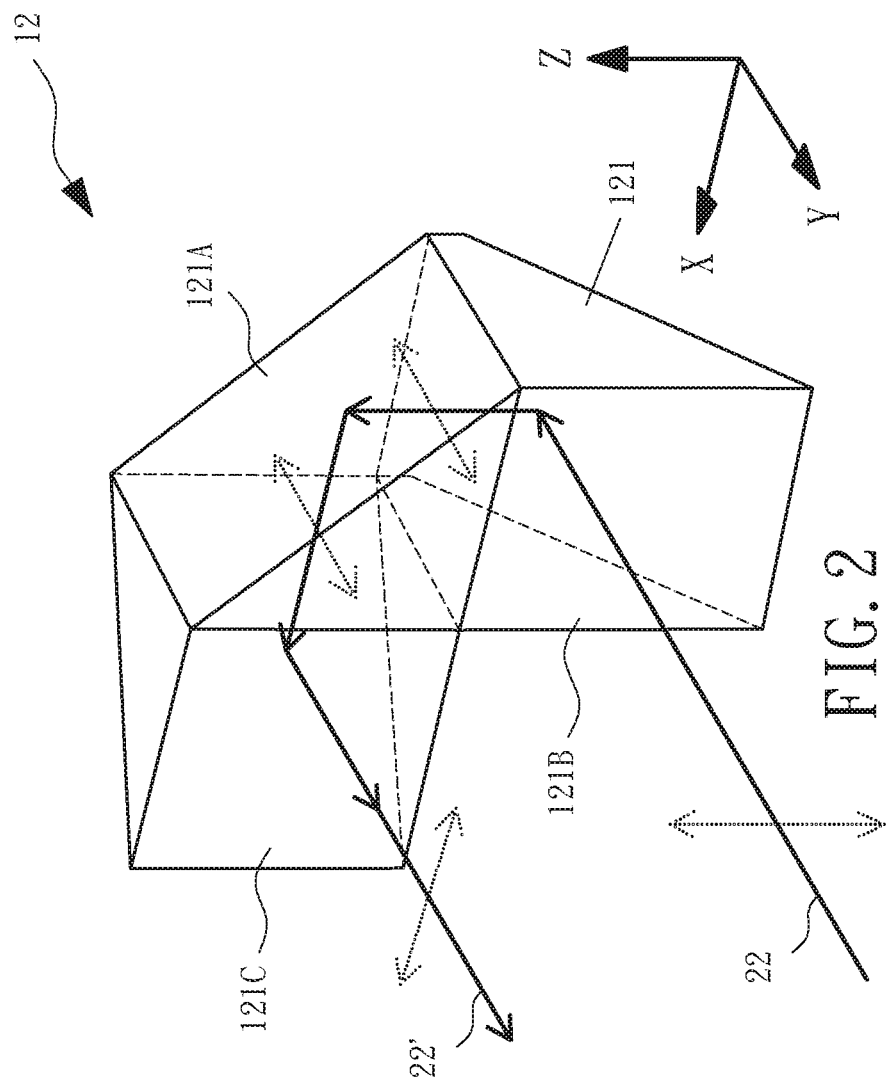
FIG. 2 shows a structure diagram of converting module of the present application.

FIG. 2 shows a structure diagram of converting module 12 of present application. The converting module 12 comprises a plurality sub module 121 formed integrally. The sub modules 121 are serially connected to each other. Each sub module 121 comprises an input plane 121B, an inclined plane 121A, and an output plane 121C. The input plane 121B is configured to receive the input light (second polarization wave 22). Each of inclined planes 121A has an inclined angle, and faces to a particular plane. When the second polarization wave 22 hits the inclined plane 121A, the inclined plane 121A would reflect the second polarization wave 22 to the direction of next inclined plane 121A. The inclined planes have a plurality of reflection direction so as to form a light path. The polarization direction of second polarization wave 22 would be rotated when it hits the inclined planes sequentially.

Figure 3:
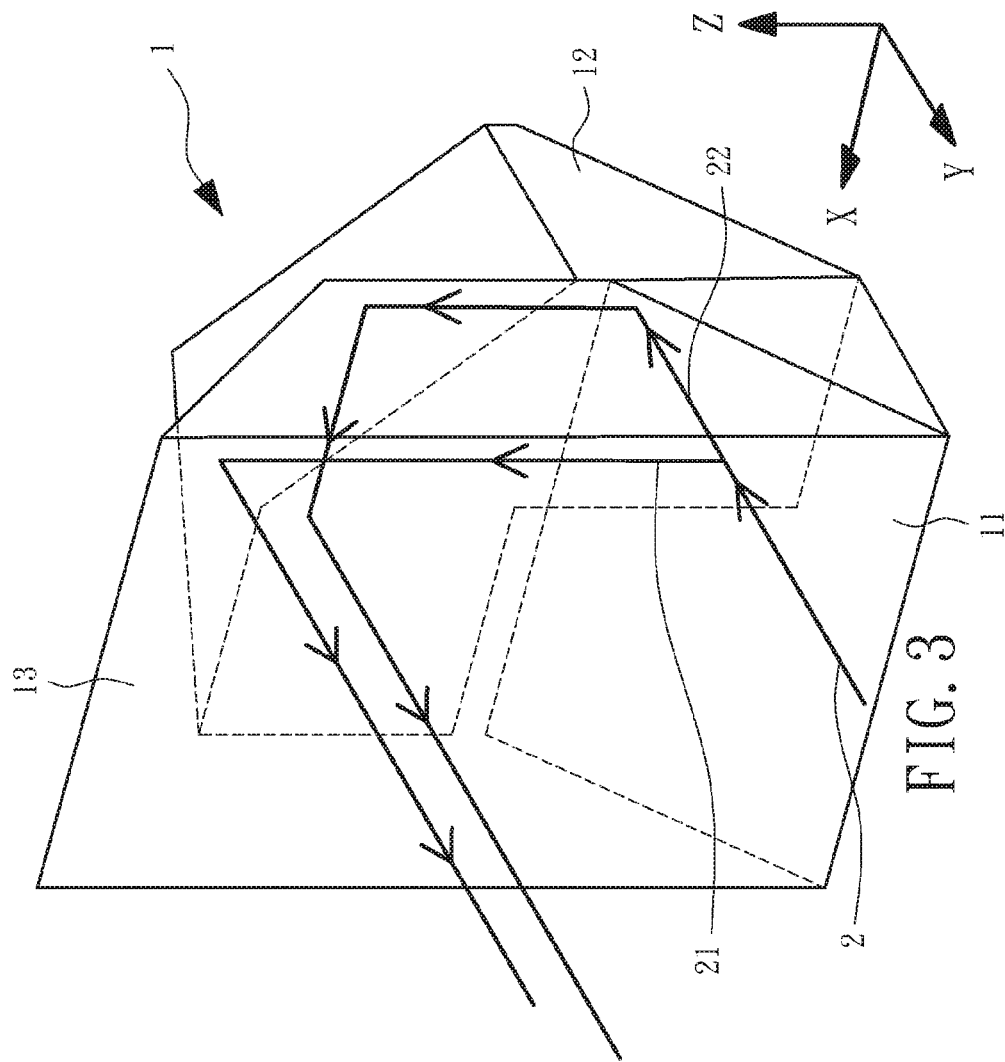
FIGS. 3-4 shows one embodiment of present application.
Figure 4:
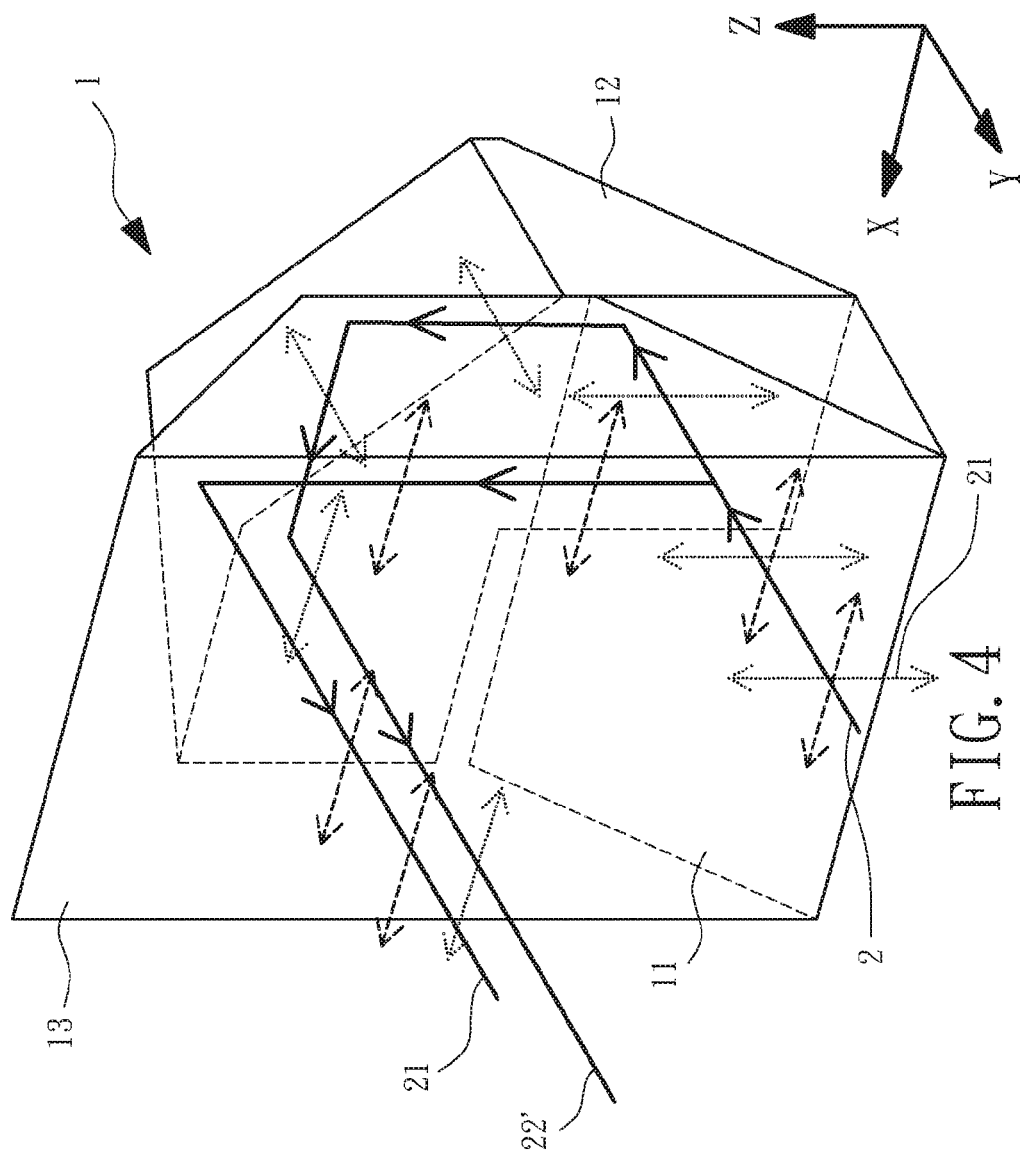

FIGS. 3 and 4 show one embodiment of present application. When converting device 1 receives an unpolarized incident light 2, the polarizing or polarization beam splitter 11 splits the unpolarized light into two polarization wave (TE wave and TM wave), then the polarizing or polarization beam splitter 11 reflects first polarization wave 21 to the retroreflector 13 and allows the second polarization wave 22 passing through thereon. FIG. 4 shows converting process of the second polarization wave 22. When the second polarization wave 22 hits the first inclined plane 121A, the first inclined pane 121A reflects and rotates portion polarization direction of second polarization wave 22 to the next inclined plane 121A. Each of inclined planes 121A rotates portion polarization direction of the second polarization wave 22 sequentially, and finally provides an converted second polarization wave 22'. The converted second polarization wave 22' has same or approximate polarization direction with first polarization wave 21. Then, the reflected first polarization wave 21 and converted second polarization wave 22' are jointly combined to form an emitting light.

Figure 5:
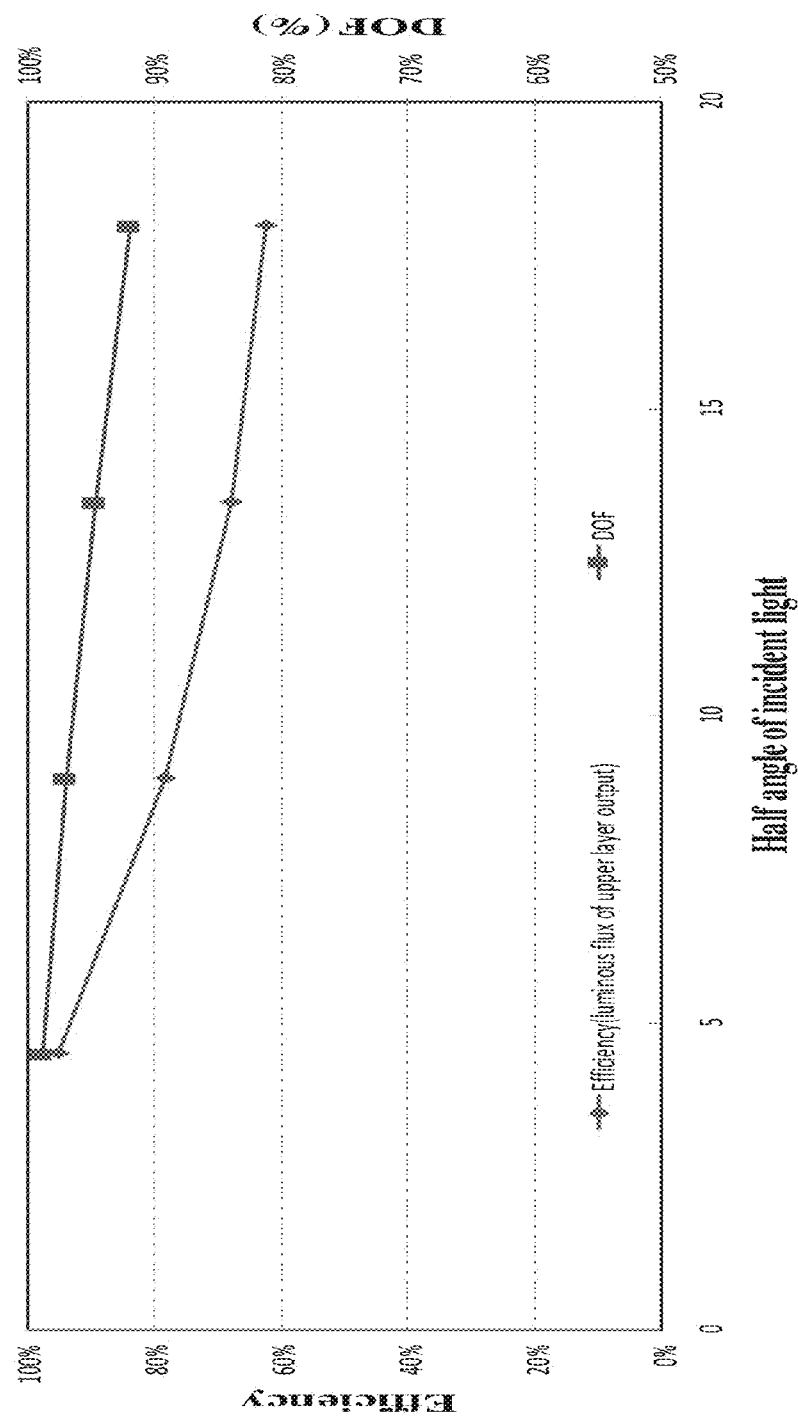
FIG. 5 shows a measured data of the energy usage efficiency and DOF of the converting device.

FIG. 5 shows an measured data of the energy usage efficiency and DOF (Degree of Polarization) of the converting device 1. The measured data of FIG. 5 is shown in following table.

| Half angle of incident light (degree) | Efficiency (%) | DOF (%) |
| --- | --- | --- |
| 18° | 62.481% | 91.8631% |
| 13.5° | 67.801% | 94.6903% |
| 9° | 78.357% | 96.9065% |
| 4.5° | 95.048% | 98.8553% |

The x-axis is the half angle of incident light, the left y-axis is the energy usage efficiency of the converting device 1, and the right y-axis is the DOF value of the converting device 1. In conventional converting apparatus, it only uses one of polarization waves and losses the other one polarization wave. For example, considering the IL wave and TM wave of unpolarized light have the same energy distribution, and the conventional converting apparatus only pass one of IL wave and TM wave. Therefore, the energy usage efficiency of conventional converting apparatus is less than 50%.

In contrast of absorbing undesired polarization wave, the converting device 1 converts the polarization direction of the undesired polarization wave (second polarization wave 22) to the desired polarization direction, then combines with the desired polarization wave. Therefore, the energy usage efficiency of converting device 1 is better than the conventional converting apparatus.

Figure 6:
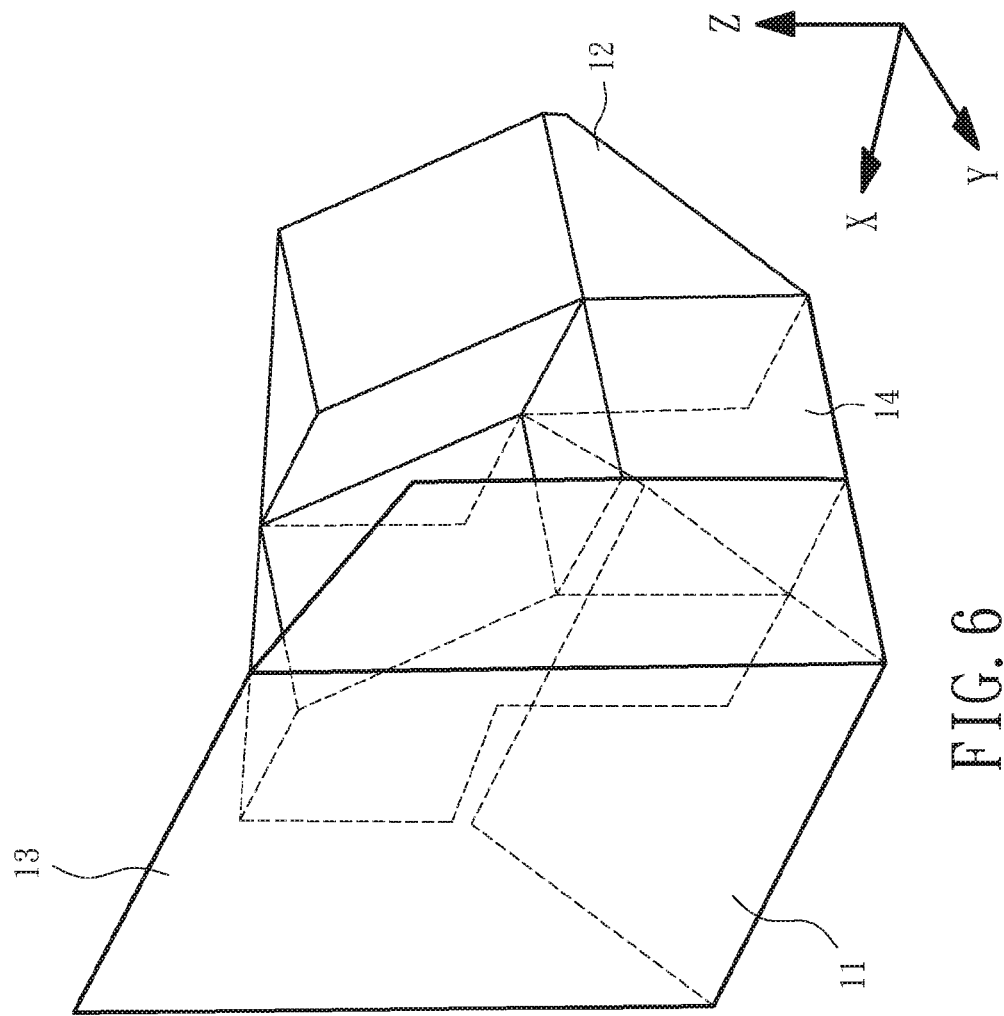
FIG. 6 shows a of structure diagram of the array device.
Figure 7:
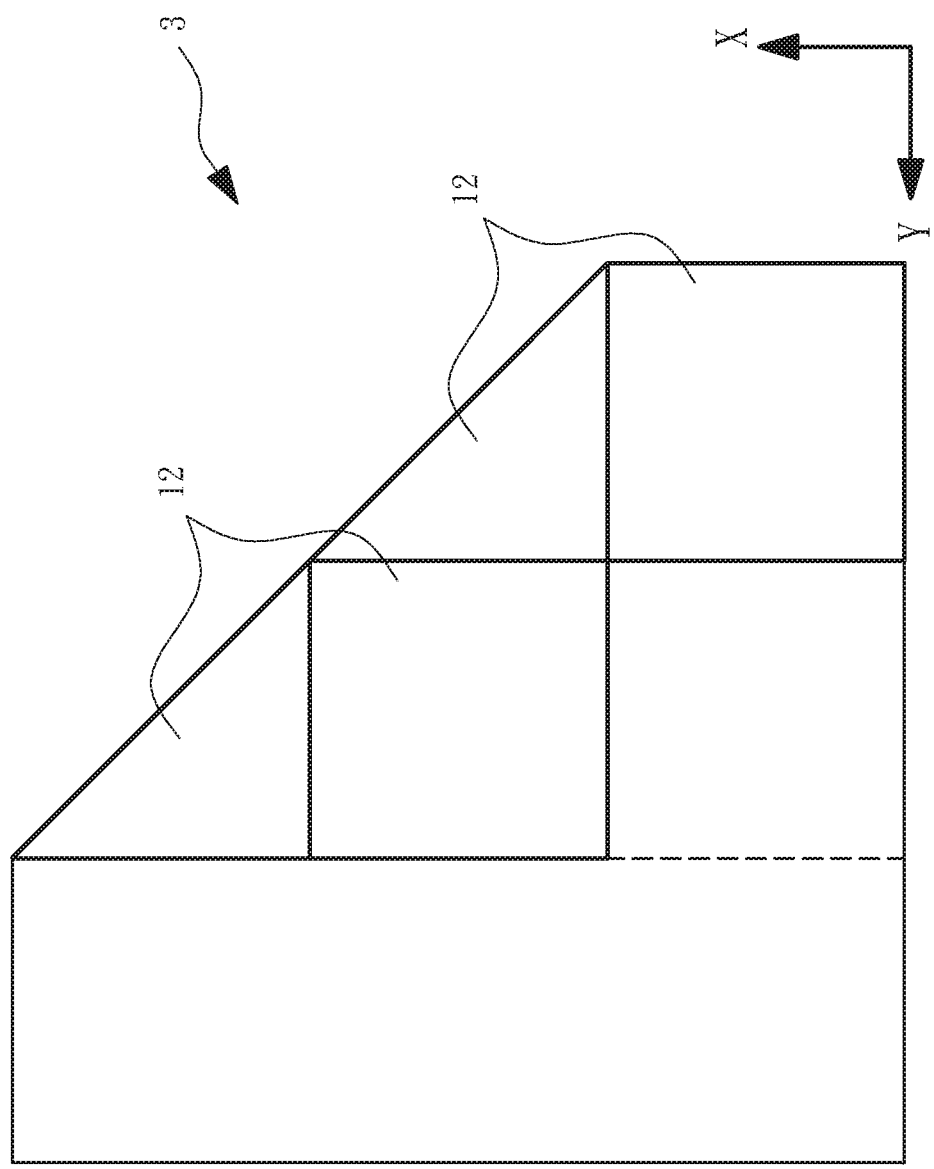
FIG. 7 shows a top plan view of the array device of FIG. 6.
Figure 8:
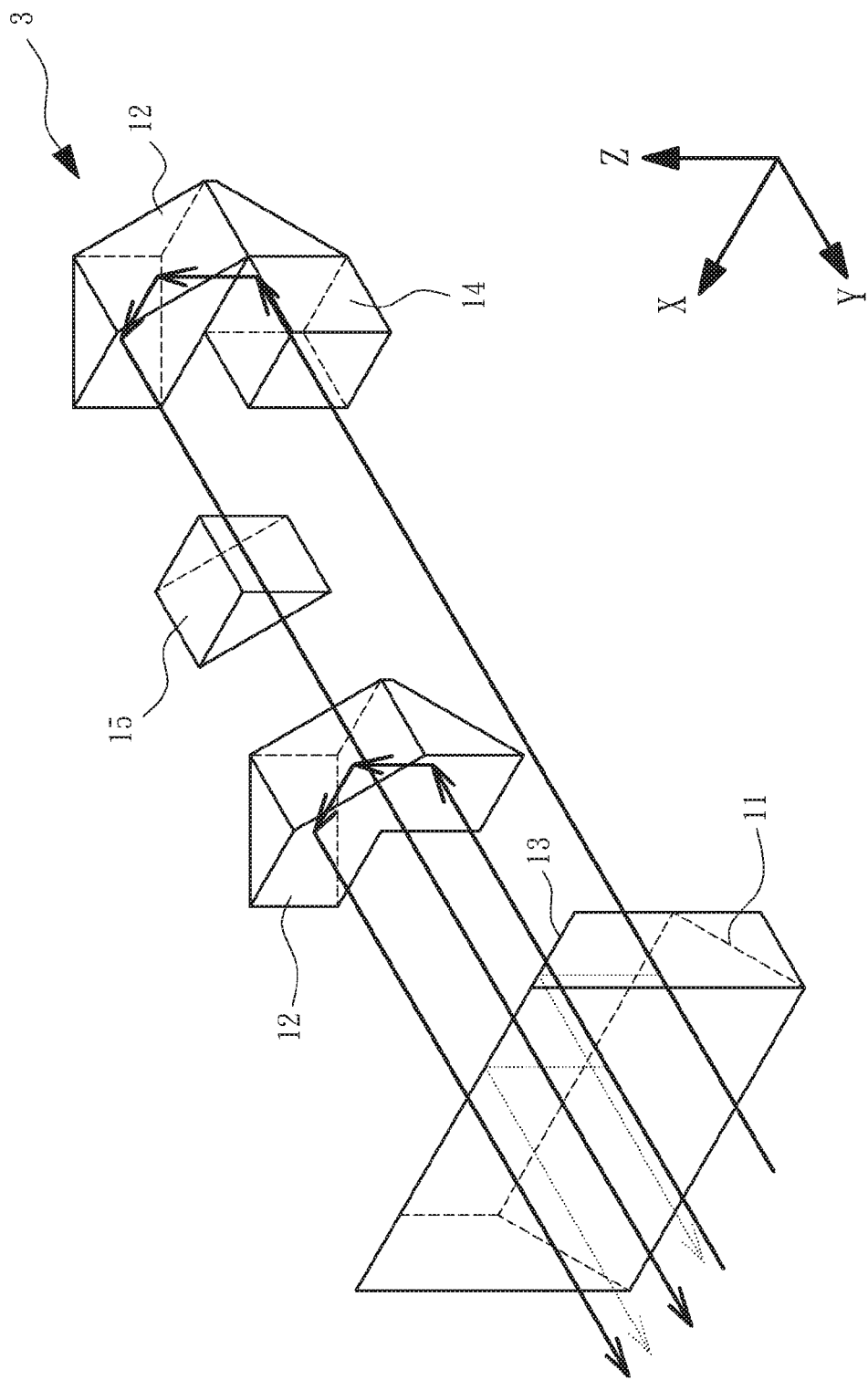
FIG. 8 shows an explode view of the array device of FIG. 6.

FIGS. 6, 7 and 8 show an array device 3 for converting an unpolarized incident light 2 into the polarized emitting light. The array device 3 comprises a plurality of neighboring converting modules 12. The output end of one of the converting module 12 is attached to the neighbored sub module 121, and the attached portion of the neighbored sub module 121 excludes input end and output end to avoid the structure interfere. The array device 3 further comprises a first transmission module 14 and a second transmission module 15. The first transmission module 14 is configured between the polarizing or polarization beam splitter 11 and input end of sub module 121 which excludes the head end of the converting modules 12. The second transmission module 15 is configured between the retroreflector 13 and the output end of the converting module 12 which excludes the head end of the converting modules 12.

The material of the first transmission module 14 and the material of the converting device 1 have same refractive index or approximate refractive index so as to avoid transmission loss between the polarizing or polarization beam splitter 11 and the converting module 12.

The material of the converting device 1 is selected from the PMMA (Polymethylmethacrylate), glass, resin, or the combination thereof.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An array device for converting unpolarized incident light into polarized emitting light, comprising:
   a polarizing or polarization beam splitter, configured to split the unpolarized incident light into a first polarization wave and a second polarization wave, wherein the polarizing or polarization beam splitter reflects the first polarization wave and allows the second polarization wave passing through thereon;
   a plurality of converting modules, which receive the second polarization wave and convert a polarization direction of the second polarization wave to a polarization direction of the first polarization wave and guide a converted second polarization wave to an output direction; and
   a retroreflector, coupled to the polarizing or polarization beam splitter and configured to reflect the first polarization wave to the output direction;
   wherein, a reflected first polarization wave and the converted second polarization wave are jointed together to form the polarized emitting light.

2. The array device as claimed in claim 1, wherein the converting modules are located near to each other.

3. The array device as claimed in claim 2, wherein each of the converting modules configures a plurality of sub modules, the sub modules are connected in series to each other, each of the sub modules comprises an inclined plane, and the inclined planes form a light path to rotate the polarization direction of the second polarization wave.

4. The array device as claimed in claim 3, wherein each inclined plane faces to a predetermined direction so as to form the light path.

5. The array device as claimed in claim 3, wherein a section shape of the converting module approximates to a L shape.

6. The array device as claimed in claim 5, wherein an output end of one of the converting modules is attached to the sub module of an adjacent converting module, wherein an attached sub module of the adjacent converting module excludes input end and output end of the sub modules.

7. The array device as claimed in claim 6, further comprising a plurality of first transmission modules, wherein each first transmission module is configured between the polarizing or polarization beam splitter and input end of the sub modules which excludes a head end of the converting modules.

8. The array device as claimed in claim 7, wherein material of the converting modules and material of the first transmission modules have same refractive index or approximate refractive index.

* * * * *